US005138349A

United States Patent [19]

Casey et al.

[11] Patent Number: 5,138,349

[45] Date of Patent: Aug. 11, 1992

[54] APPARATUS FOR REDUCING THE EFFECTS OF AMBIENT HUMIDITY VARIATIONS UPON AN IONOGRAPHIC PRINTING DEVICE

[75] Inventors: Brendan C. Casey; John A. Frank, both of Webster; William L. Gary, Lyons, all of N.Y.

[73] Assignee: Xerox Corporation, Stamford, Conn.

[21] Appl. No.: 585,751

[22] Filed: Sep. 20, 1990

[51] Int. Cl.⁵ .............................................. G01D 15/06

[52] U.S. Cl. ...................................................... 346/159

[58] Field of Search ................................ 346/158-159

[56] References Cited

U.S. PATENT DOCUMENTS

| | | | |
|---|---|---|---|
| 4,463,363 | 7/1984 | Gundlach et al. | 346/159 |
| 4,644,373 | 2/1987 | Sheridan et al. | 346/159 |
| 4,646,196 | 2/1987 | Reale | 361/230 |
| 4,727,388 | 2/1988 | Sheridon et al. | 346/159 |
| 4,743,925 | 5/1988 | Sheridon et al. | 346/159 |
| 4,772,901 | 9/1988 | Boyer et al. | 346/159 |
| 4,779,107 | 10/1988 | Weisfield et al. | 346/159 |
| 4,812,860 | 3/1989 | Sheridan et al. | 346/159 |
| 4,841,146 | 6/1989 | Gundlach et al. | 250/324 |
| 4,853,719 | 8/1989 | Reale | 346/155 |
| 4,973,994 | 11/1990 | Schneider | 346/159 |

*Primary Examiner*—George H. Miller, Jr.
*Attorney, Agent, or Firm*—Paul J. Maginot

[57] ABSTRACT

A printer member adapted to be used in an ion printing device having a conductive coating positioned on a portion of the marking head near the charge receiver. The conductive coating is electrically connected to the housing in order to substantially equalize the voltage potential of the housing and marking member. The above arrangement enables the device to be set at a single operating state that would allow the device to operate very near its breakdown threshold at all humidity levels.

13 Claims, 3 Drawing Sheets

APPARATUS FOR REDUCING THE EFFECTS OF AMBIENT HUMIDITY VARIATIONS UPON AN IONOGRAPHIC PRINTING DEVICE

This invention relates generally to ionographic systems for creating images, and more particularly, concerns an apparatus which reduces the effects of ambient humidity variations upon an ionographic printing device.

An ion printing device, of the type utilized herein, is disclosed in U.S. Pat. No. 4,463,363 issued on Jul. 31, 1984 in the names of Robert W. Gundlach and Richard F. Bergen, entitled "Fluid Assisted Ion Projection Printing." In that device, an imaging charge is placed upon a moving charge receiver sheet, such as papers, by means of a linear array of closely spaced minute air "nozzles". The charge, comprising ions of a single polarity (preferably positive), is generated in an ionization chamber of a printer head and is then transported to and through the "nozzles" of the printer head where it is electrically controlled, within each "nozzle" structure, by an electrical potential applied to modulating electrodes therein. Selective control of the modulating electrodes in the array will correspondingly selectively enable or inhibit particular spots of charge to be deposited on the charge receiver sheet for subsequent development.

Under certain circumstances, the flow of ions existing the printer head will cause an electrical shorting or arcing between the charge receiver and the printer head. This electrical shorting or arcing is referred to as printer head-to-receiver breakdown. The point at which this breakdown occurs (i.e. the breakdown threshold) is a function of a number of variables including the distance between the printer head and the charge receiver, the flow rate of the ions exiting the printer head, and the humidity level of the ambient air.

The portions of the printer head to which electrical shorting or arcing have been known to occur is the housing and the marking member which contains the modulating electrodes. Whether the breakdown occurs to the housing or the marking member depends in part upon the humidity level of the ambient air.

Humidity in the air has been known to cause moisture to accumulate on the surface of the marking member. This is true during periods when the humidity level of the ambient air is high. This moisture causes the marking member to be conductive. When the marking member is conductive, breakdown will occur between the charge receiver and the marking member since the distance between the marking member and the charge receiver is less than the distance between the charge receiver and the housing.

On the other hand, during periods when the humidity level of the ambient air is low, no significant amount of moisture will accumulate on the surface of the marking member and therefore the marking member will not become conductive. As a result, in such periods of low humidity, breakdown will occur to the housing.

Since the quality of a latent image generated by the printer head and deposited on the charge receiver is known to improve as the device approaches its breakdown threshold, it is desirable to control the variables affecting breakdown such that the device is maintained at an operating state very near its breakdown threshold.

While the flow of the ions exiting the printer head can be set at a fixed rate and the distance between the printer head and the charge receiver can be set at a fixed distance, the ambient humidity level of a certain device's environment fluctuates substantially uncontrollably from one location to another and even from day to day at that location. As a result, printer head-to-receiver breakdown may occur to either the marking member (if high ambient humidity levels) or the housing (if low ambient humidity levels). Since the distance between the marking member and the charge receiver is less than the distance between the charge receiver and the housing, setting the device at a single operating state that would allow the device to operate very near its breakdown threshold at all humidity levels has heretofore not been achieved.

Moreover, positioned adjacent the charge receiver on the side opposite the printer head is an accelerating electrode. This electrode is electrically connected to a high voltage potential source in order to produce an associated electrostatic field. The electrostatic field serves to facilitate the deposit of the modulated charge exiting the printer head onto the charge receiver.

While the electrostatic field produced by the accelerating electrode provides the above beneficial function, such field also has been known to interfere with the flow of ions within the modulating region and thus negatively affect the ionographic printing process. Heretofore, ionographic printing devices were not provided with any appropriate means by which such interference could be reduced.

The following disclosures may be relevant to various aspects of the present invention:

U.S. Pat. No. 4,772,901—Patentee: Boyer et al.—Issued: Sep. 20, 1988

U.S. Pat. No. 4,812,860—Patentee: Sheridan et al.—Issued: Mar. 14, 1989

U.S. Pat. No. 4,644,373—Patentee: Sheridan et al.—Issued: Feb. 17, 1987

U.S. Pat. No. 4,646,196—Patentee: Reale—Issued Feb. 24, 1987

U.S. Pat. No. 4,727,388—Patentee: Sheridan et al.—Issued: Feb. 23, 1988

U.S. Pat. No. 4,743,925—Patentee: Sheridan et al.—Issued: May 10, 1988

U.S. Pat. No. 4,779,107—Patentee: Weisfield et al.—Issued: Oct. 18, 1988

U.S. Pat. No. 4,841,146—Patentee: Gundlach et al.—Issued: Jun. 20, 1989

U.S. Pat. No. 4,853,719—Patentee: Reale—Issued: Aug. 1, 1989

The relevant portions of the foregoing disclosures may be briefly summarized as follows:

U.S. Pat. No. 4,772,901 describes an ionographic printing device that supplies dehumidified air at, near or through the printer head of the device. The purpose of supplying dehumidified air as described is to improve print quality and prolong the operating life of certain components of the device.

U.S. Pat. No. 4,812,860 discloses an ionographic printing device that prevents the accumulation of moisture on the marking head by having a heater in proximity thereto in order to elevate the temperature of the modulating region.

U.S. Pat. No. 4,644,373 also discloses an ionographic printing device. The device comprises a one-piece body having a generally U-shaped cavity and a conductive wire positioned therein. The conductive wire is supported on the body and extends in the direction of the cavity and is located closer to one of the walls of the cavity than to the other walls of the cavity.

U.S. Pat. No. 4,646,196 describes a corona generating device for depositing negative charge on an imaging surface. The device includes at least one elongated conductive corona discharge electrode and at least one element adjacent the corona discharge electrode capable of absorbing nitrogen oxide species generated once the corona generating device is energized and further capable of desorbing nitrogen oxide species once that electrode is not energized. The element is coated with a substantially continuous thin conductive dry film of aluminum hydroxide.

U.S. Pat. No. 4,727,388 discloses a marking array of an ionographic marking apparatus having improved corrosion resistance. A relative bias on the order of about 10% of the ion output cut-off bias is imposed across the ion modulation region in order to inhibit the deterioration effects of the ions on the modulation electrodes.

U.S. Pat. No. 4,743,925 also describes a marking array for use in an ionographic marking apparatus. The individual marking electrodes of this marking array are formed of an alloy of aluminum and copper wherein the copper is in the range of 0.5% to 4.0%.

U.S. Pat. No. 4,779,107 discloses another marking array for use in an ionographic marking apparatus. Improved marking electrodes are provided which comprise a thin film body of a conductive material having a surface which is chemically neutral to the corona effluents.

U.S. Pat. No. 4,841,146 discloses a self-cleaning scorotron with a focused ion beam. The scorotron has biased conductive plates on the bottom of an insulating housing to control the flow of ions through a slit in the corotron.

U.S. Pat. No. 4,853,719 describes an ion projection printing head having a conductive metal body defining an entrance channel, an ion generating chamber and an exit channel. The entire surface of the ion generating chamber and a portion of the surface of the exit channel is coated with a substantially continuous thin conductive film of aluminum hydroxide containing conductive particles.

In accordance with one aspect of the present invention, there is provided an ion printing device which comprises a charge receiver and a printer head positioned substantially adjacent the charge receiver. The printer head includes a housing, means positioned within the housing for generating a flow of ions, and means positioned substantially adjacent the housing for modulating the flow of ions. The ion printing device further comprises means for substantially equalizing the voltage potential of the housing and the modulating means.

Pursuant to another aspect of the present invention, there is provided a printer head, which comprises a housing and means, positioned within the housing, for generating a flow of ions. Means, positioned substantially adjacent the housing, are provided for modulating the flow of ions. Means are also provided for substantially equalizing the voltage potential of the housing and the modulating means.

Other features of the present invention will become apparent as the following description proceeds and upon reference to the drawings, in which.

While the present invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

Figure 1:
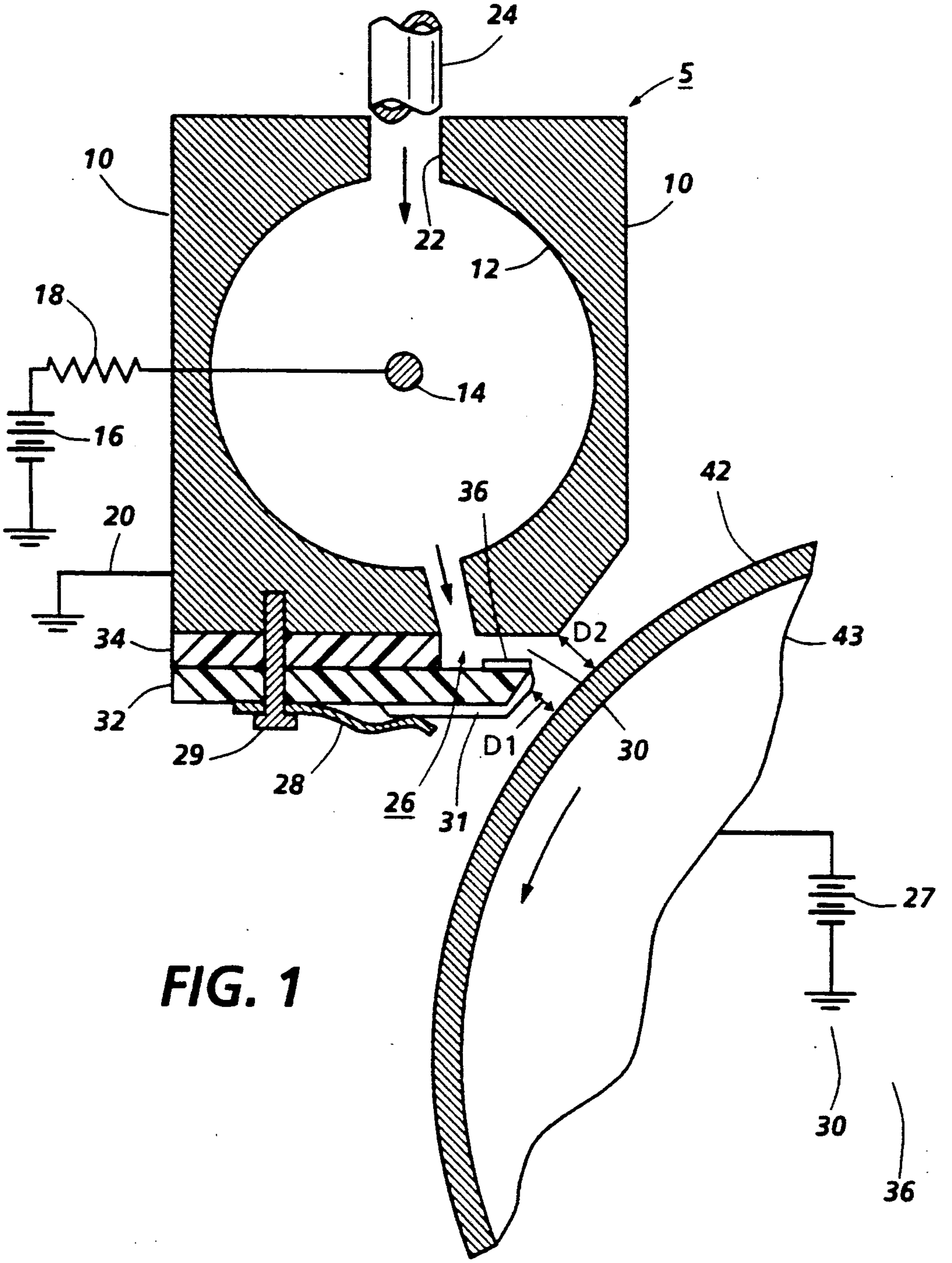
FIG. 1 is a schematic sectional elevational view depicting an ion projection device of the present invention.

Referring now to FIG. 1, there is illustrated a printer head 5 which includes an ion generating housing 10. Housing 10 includes an electrically conductive, elongated chamber 12 and a corona discharge wire 14, extending along the length of the chamber. A high potential source 16, on the order of several thousand volts dc, is connected to the wire 14 through a suitable load resistor 18, and a reference potential source 20 (which is preferably ground—i.e. approximately zero volts) is connected to the wall of the chamber 12. Upon application of the high potential to corona discharge wire 14, a corona discharge surrounds the wire, creating a source of ions of a given polarity (preferably positive), which are attracted to the grounded chamber wall and fill the chamber with a space charge.

An inlet channel 22 extends along the chamber substantially parallel to wire 14 to deliver pressurized transport fluid (preferably air) into the chamber 12 from a suitable source, schematically illustrated by a tube 24. An outlet channel (indicated generally by the numeral 26), which extends from the chamber 12, also extends substantially parallel to wire 14, at a location opposed to inlet channel 22, for conducting the ion-laden transport fluid to the exterior of housing 10. The outlet channel 26 comprises two portions, a first portion directed substantially radially outwardly from the chamber and a second portion 30 angularly disposed to the first portion. The second portion 30 is formed by the unsupported extension of a marking member 32 spaced from and secured to the housing by an insulating shim 34.

The ion-laden transport fluid is selectively allowed to pass through outlet channel 26 and then over an array of ion pixel or modulating electrodes 36, each extending in the direction of the fluid flow, and integrally formed on marking member 32.

Ions allowed to pass completely through and out of printer head 5, come under the influence of an accelerating back electrode 43 which is connected to a high voltage potential source 27, on the order of several thousand volts dc, and of a sign opposite to that of the corona source 16. The ions which pass through printer head 5 collect on the surface of a charge receiver 42 in an image configuration. The distance between charge receiver 42 and marking member 32 is shown in FIG. 1 as D1 and is preferably about 0.006 inches. D1 represents the shortest distance between charge receiver 42 and marking member 32. The distance between charge receiver 42 and housing 10 is shown in FIG. 1 as D2 and is preferably about 0.010 inches. D2 represents the shortest distance between charge receiver 32 and housing 10. The ion-laden transport fluid stream exiting printer head 5 can be rendered intelligible by selectively controlling the potential of modulating electrodes 36 by any suitable means.

A conductive layer 31 is coated on a portion of marking member 32, near charge receiver 42. Preferably, conductive layer 31 is comprised of a conductive paint such as #21-1 GC Electronics Silver Paint manufactured by GC Electronics in Rockford, Ill. Conductive layer 31 is electrically connected to housing 10 through conductive connecting member 28 and conductive stud 29. The above arrangement provides a means for substantially equalizing the voltage potential of housing 10 and marking head 32. With the voltage potential of housing 10 substantially equal to the voltage potential of marking member 32, printer member to-receiver breakdown will occur to marking member 32 at all humidity levels. This is true since the distance between charge receiver 42 and marking member 32 is less than the distance between charge receiver 42 and housing 10. Since breakdown will occur to the marking member at all humidity levels, the device can be set at a single operating state that would allow the device to operate very near its breakdown threshold at all humidity levels. More specifically, the flow of the ions exiting the printer head can be set at a fixed rate and the distance between the printer head and the charge receiver can be set at a fixed distance in order to allow the device to operate very near its breakdown threshold, irrespective of fluctuations in the humidity level. Recall that the quality of a latent image generated by the printer head and deposited on the charge receiver is known to improve as the device approaches its breakdown threshold.

In addition to the advantage of being able to operate the device at a state very near its breakdown threshold, irrespective of fluctuations in the humidity level, the coating also prevents the electrostatic field produced by the accelerating electrode and charge receiver from interfering with the flow of ions within the modulating region which would otherwise negatively affect the ionographic process.

As described in U.S. Pat. No. 4,463,363, the relevant portions thereof being incorporated herein by reference, once the ions in the transport fluid stream come under the influence of modulating electrodes 36, they may be viewed as individual "beams", which may be allowed to pass to charge receiver 42 or to be suppressed within the outlet channel. "Writing" of a single spot or pixel in a raster line is accomplished when a modulating electrode is selectively connected to a potential source at substantially the same potential as that on the opposing wall of outlet channel 26. With both walls of the channel being at about the same electrical potential, there will be substantially no electrical field extending thereacross. Thus, ions passing therethrough will be unaffected and will exit the housing to be deposited upon the charge receiver.

Conversely, when a suitable potential is applied to the modulating electrode, a field will extend across outlet channel 26 to the opposite, electrically grounded, wall. If the electrical potential imposed on the modulating electrode is of the same sign as the ions, the ion "beam" will be repelled from the modulating electrode to the opposite wall where the ions may recombine into uncharged, or neutral, air molecules. If the electrical potential imposed on the modulating electrode is of the opposite sign as the ions, the ion "beam" will be attracted to the modulating electrode where they may recombine into uncharged or neutral, air molecules. Therefore, that "beam" of transport fluid, exiting from the housing in the vicinity of that modulating electrode, will carry substantially no "writing" ions.

An imagewise pattern of information may be formed by selectively controlling each of the modulating electrodes in the array so that the ion beams associated therewith are either enabled or are inhibited from exiting the housing in accordance with the pattern and intensity of light and dark spots of the image to be reproduced. It should be understood that the image to be recorded on the charge receiver is generally a digital image and that each light and dark spot is generally represented by a string of one or more similar binary values.

Figure 2:
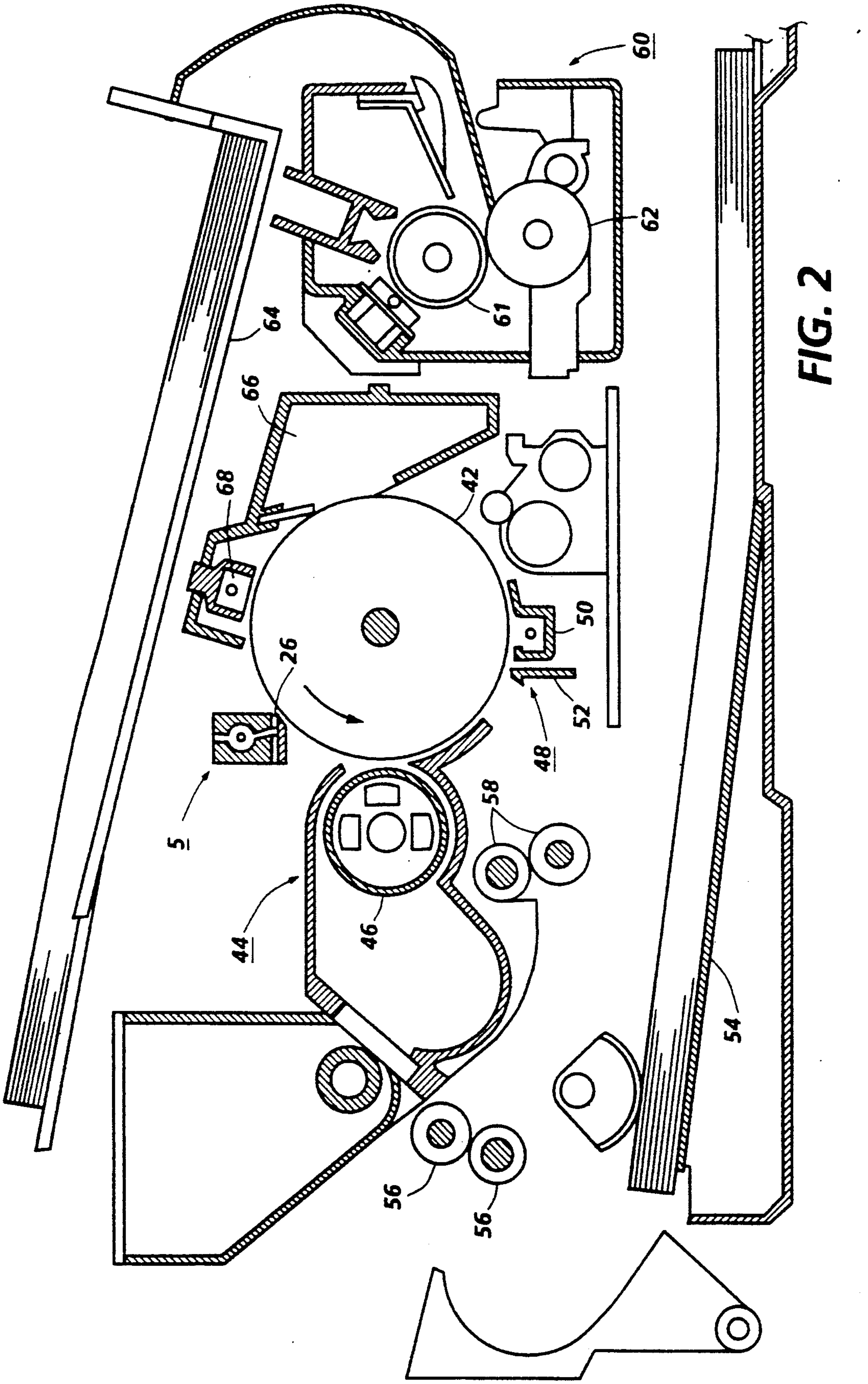
FIG. 2 is a schematic elevational view, partially in section, depicting an electrographic printing machine incorporating the ion projection device of FIG. 1.

With reference to FIG. 2, there is disclosed in general a printing apparatus in accordance with the present invention. Initially, charge receiver 42, a substrate supporting any suitable electrostatic material, is charged to an appropriate background voltage (preferably −1500 volts). A point on charge receiver 42 is rotated in a direction of the arrow past the outlet channel 26 of printer head 5. The charge pattern corresponding to the image to be reproduced is projected onto the surface of charge receiver 42 providing a latent image. Upon further rotation of the point on charge receiver 42 to a developer station (generally shown at 44), suitable developer rolls 46 such as magnetic development rolls advance a developer material into contact with the electrostatic latent image. The latent image attracts toner particles from the carrier granules of the developer material to form a toner powder image upon the surface of charge receiver 42.

The point on charge receiver 42 is then advanced to a transfer station shown generally at 48 where a copy sheet is moved into contact with the powder image. The transfer station 48 includes a transfer corona generating device 50 for spraying ions onto the backside of the copy sheet and also includes a pretransfer baffle generally shown at 52. Copy sheets are fed from selected trays, for example, tray 54 and conveyed through a suitable copy sheet paper path, driven by suitable rolls such as rolls 56 and 58 to the transfer station.

After transfer, the copy sheet is driven to fuser station 60 including fusing rolls for permanently affixing the transferred powder image to the copy sheet. Preferably, the fuser station includes a heated fuser roll 61 and backup or pressure roll 62 with the sheet passing therebetween. After fusing, the copy sheet is transported to a suitable output tray such as illustrated at 64. In addition, a suitable cleaner 66, for example, a blade cleaner in contact with the receiver surface removes residual particles from the surface. Finally, an erase corona generating device 68 neutralizes the charge on charge receiver 42 and recharges the receiver to the background voltage.

Figure 3:
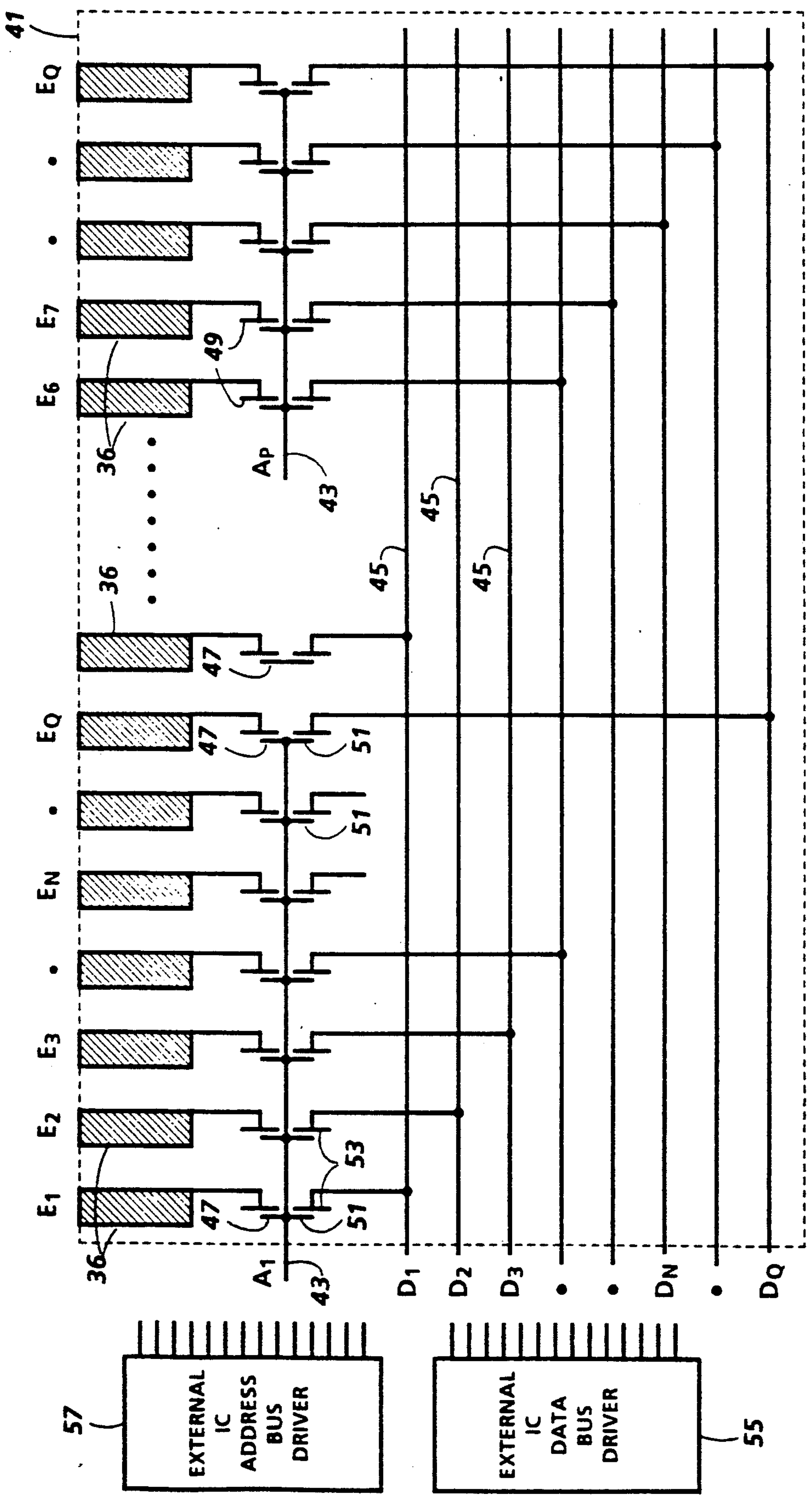
FIG. 3 is a schematic representation of the marking member of FIG. 1, showing the modulating electrodes, the switching elements and the driver circuitry.

Marking member 32 of FIG. 1, includes the elements schematically illustrated in FIG. 3 supported upon a planar substrate 41 (represented by the dotted outline). These elements include the array of modulating electrodes (E) 36 and a multiplexed data entry or loading circuit, comprising a small number of address bus lines (A) 43 and data bus lines (D) 45. Each of the modulating electrodes in the array is individually switchable while simultaneously reducing the number of wire bonds required to interface the electrodes with external driver circuits 55 and 57. Thin film switches 47 are fabricated directly on the marking member between the electrodes 36 and the data bus lines 45 and connected serially by small traces so that no wire bonds are required.

In recapitulation, a conductive layer is coated on a portion of the marking member near the charge receiver. The conductive coating is electrically connected to the housing in order to provide a means for substantially equalizing the voltage potential of the housing and marking member. The above arrangement enables the device to be set at a single operating state that would allow the device to operate very near its breakdown threshold at all humidity levels.

It is, therefore, apparent that there has been provided in accordance with the present invention, a printer head that is adapted to be used in an ion printing device that fully satisfies the aims and advantages hereinbefore set forth. While this invention has been described in conjunction with a specific embodiment, it is evident that many alternatives, modifications, and variations will be apparent to those skilled in the art. Accordingly, it is intended to embrace all such alternatives, modifications and variations that fall within the spirit and broad scope of the appended claims.

We claim:

1. An ion printing device, comprising:

a charge receiver;

a printer head positioned substantially adjacent said charge receiver, wherein said printer head includes a housing, means positioned within the housing for generating a flow of ions, and a marking member positioned substantially adjacent the housing, the marking member comprising a substrate and a plurality of modulating electrodes; and means for substantially equalizing the voltage potential of the housing and the substrate, said equalizing means comprising a conductive layer on at least a portion of the substrate, with at least a portion of the conductive layer being interposed between the substrate and said charge receiver.

2. The ion printing device of claim 1, wherein the conductive layer is electrically connected to the housing.

3. The ion printing device of claim 1, wherein the conductive layer and the housing are electrically connected to a common voltage potential.

4. The ion printing device of claim 1, wherein the conductive layer is coated on the substrate.

5. The ion printing device of claim 4, wherein the conductive layer is comprised of conductive paint.

6. The ion printing device of claim 1, wherein the plurality of modulating electrodes are supported upon the substrate.

7. An ion printing device, comprising:

a charge receiver;

a printer head positioned substantially adjacent said charge receiver, wherein said printer head includes a housing, means positioned within the housing for generating a flow of ions, and a marking member positioned substantially adjacent the housing, the marking member comprising a substrate and a plurality of modulating electrodes; and means for substantially equalizing the voltage potential of the housing and the substrate, said equalizing means comprising a conductive layer on at least a portion of the substrate, with said charge receiver being positioned closer to the substrate than to the housing.

8. The ion printing device of claim 7, wherein the conductive layer is electrically connected to the housing.

9. The ion printing device of claim 7, wherein the conductive layer and the housing are electrically connected to a common voltage potential.

10. The ion printing device of claim 7, wherein the conductive layer is coated on the substrate.

11. The ion printing device of claim 10, wherein the conductive layer is comprised of conductive paint.

12. The ion printing device of claim 7, wherein the plurality of modulating electrodes are supported upon the substrate.

13. An ion printing device, comprising:

a charge receiver;

a printer head positioned substantially adjacent said charge receiver, wherein said printer head includes a housing, means positioned within the housing for generating a flow of ions, and means positioned substantially adjacent the housing for modulating the flow of ions; and means for substantially equalizing the voltage potential of the housing and the modulating means, said equalizing means includes a conductive layer wherein a portion thereof is positioned adjacent to the modulating means and interposed between the modulating means and said charge receiver.

* * * * *